(12) United States Patent
Friedman et al.

(10) Patent No.: US 7,793,071 B2
(45) Date of Patent: Sep. 7, 2010

(54) METHOD AND SYSTEM FOR REDUCING CACHE CONFLICTS

(75) Inventors: Ben-Zion Friedman, Jerusalem (IL); Ohad Falik, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 11/770,107

(22) Filed: Jun. 28, 2007

(65) Prior Publication Data

US 2009/0006765 A1    Jan. 1, 2009

(51) Int. Cl.
    *G06F 12/00*    (2006.01)
(52) U.S. Cl. ...................................................... 711/220
(58) Field of Classification Search .................. 711/220
See application file for complete search history.

(56) References Cited

U.S. PATENT DOCUMENTS

| | | | | |
|---|---|---|---|---|
| 5,974,518 A | * | 10/1999 | Nogradi | ....................... 711/173 |
| 7,292,586 B2 | * | 11/2007 | Dewan et al. | ................ 370/401 |
| 7,441,096 B2 | * | 10/2008 | Kitamura | ..................... 711/203 |
| 2005/0220114 A1 | * | 10/2005 | Romano et al. | ........... 370/395.4 |
| 2006/0215679 A1 | * | 9/2006 | Musoll et al. | ................ 370/412 |

\* cited by examiner

*Primary Examiner*—Matt Kim
*Assistant Examiner*—Hamdy S Ahmed
(74) *Attorney, Agent, or Firm*—Grossman, Tucker, Perreault & Pfleger, PLLC

(57) ABSTRACT

Disclosed is a system and method for storing a plurality of data packets in a plurality of memory buffers in a cache memory for reducing cache conflicts. The method includes determining size of each of a plurality of data packets; storing a first data packet of the plurality of data packets starting from a first address in a first memory buffer of the plurality of memory buffers; determining an offset based on the size of the first data packet; and storing a second data packet in a second buffer starting from a second address based on the offset.

9 Claims, 4 Drawing Sheets

METHOD AND SYSTEM FOR REDUCING CACHE CONFLICTS

FIELD

The present disclosure relates to reducing cache conflicts, and more particularly, to methods and systems for reducing cache conflicts in Local Area Networks.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION

Figure 1:
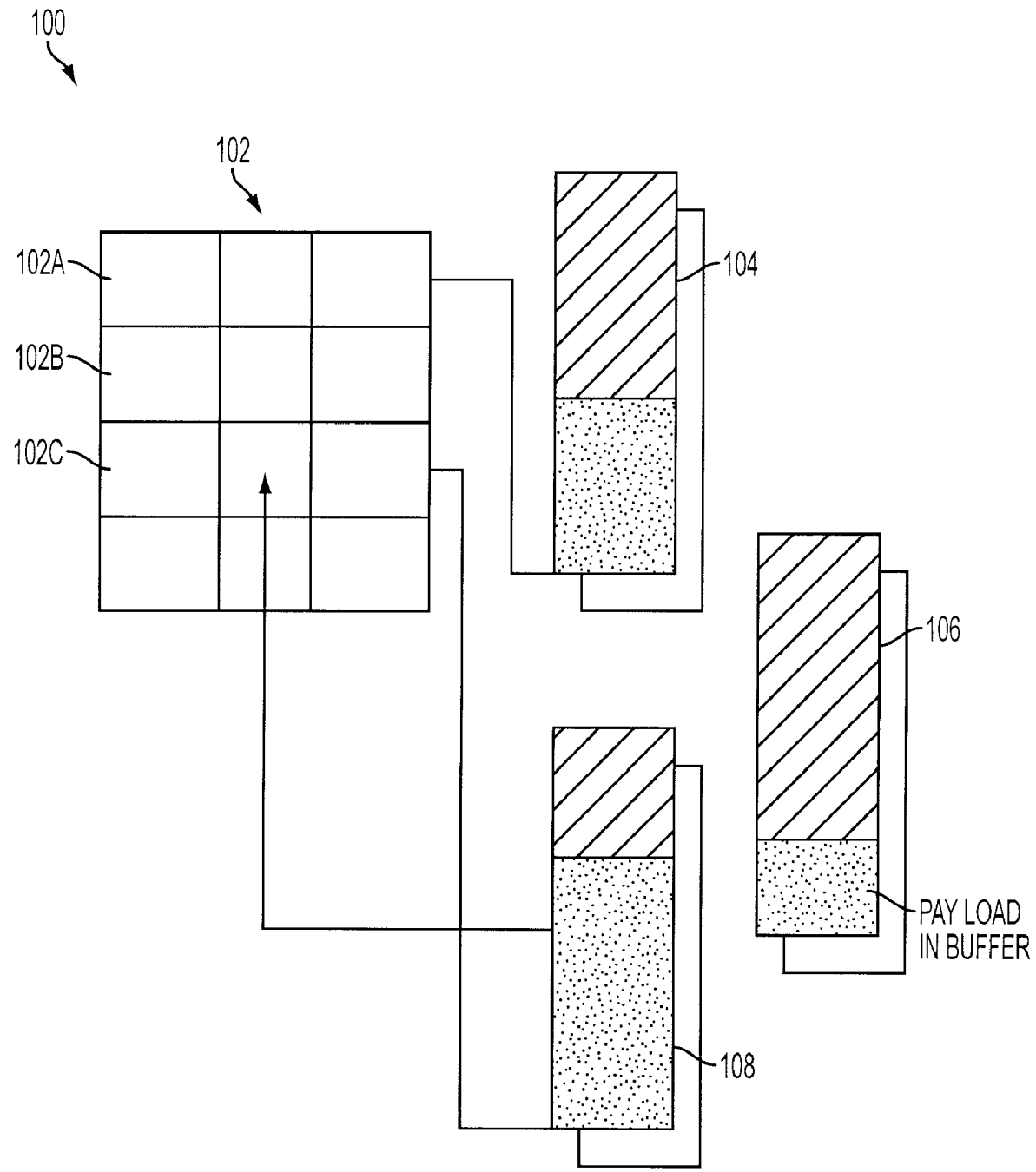
FIG. 1 is a block diagram illustrating a descriptor along with a plurality of memory buffers.

FIG. 1 is a block diagram illustrating a cache memory arrangement in a data communications system 100. The system 100 includes a group of descriptors 102 (e.g., 102A, 102B, 102C, etc.) and a plurality of memory buffers 104, 106 and 108. The memory buffers may be part of a cache memory system, for example, a cache memory of a host processing system (not shown). The group of descriptors 102 may be organized in a table or a linked list, and each buffer may be associated with a descriptor in the group of descriptors 102. Thus, for example, descriptor 102A may be associated with buffer 104, descriptor 102B may be associated with buffer 106 and descriptor 102C may be associated with buffer 108, etc. In some embodiments described herein, the group of descriptors 102 may be organized in a descriptor ring for simple continuous re-use of the descriptors. The descriptors 102 and memory buffers 104, 106 and 108 may be utilized in a data communication transfer, for example transferring of a plurality of data packets in a Local Area Network (LAN). The memory buffers may be allocated by a LAN driver (not shown) running on a processor (not shown), and then communicated to a LAN controller (not shown). A descriptor, for example 102A, may include memory buffer start address, control and status information associated with buffer 104. During memory operations, control and status information may be updated by the LAN driver in the one of the descriptors 102, as indicated by the arrow between buffer 108 and descriptor 102C.

The size of the memory buffers may be fixed, and is typically 2 kilobytes (KB) or 4 KB, allowing enough space for even the largest data packet of the plurality of data packets. Each of the buffers depicted in FIG. 1 are partially filled with payload data from respective data packets, as indicated by the solid shading (payload data) and cross-hatching (empty regions). In a conventional arrangement, the data is stored at the beginning of the allocated memory buffer from the first address and the descriptor is updated with the size of the data packet (in bytes). This information may be used by a processor to determine the location and the size of the received data packet. Since packets are stored from the beginning of the buffer, the location of the packet is implicitly defined by the location of the buffer (as may be provided by the driver). The number of memory buffers used may be proportional to the amount of data packets received and inversely proportional to the size of the data packet. For example, in a data communications environment having high bandwidth and small data packets, many memory buffers may be used.

Figure 2:
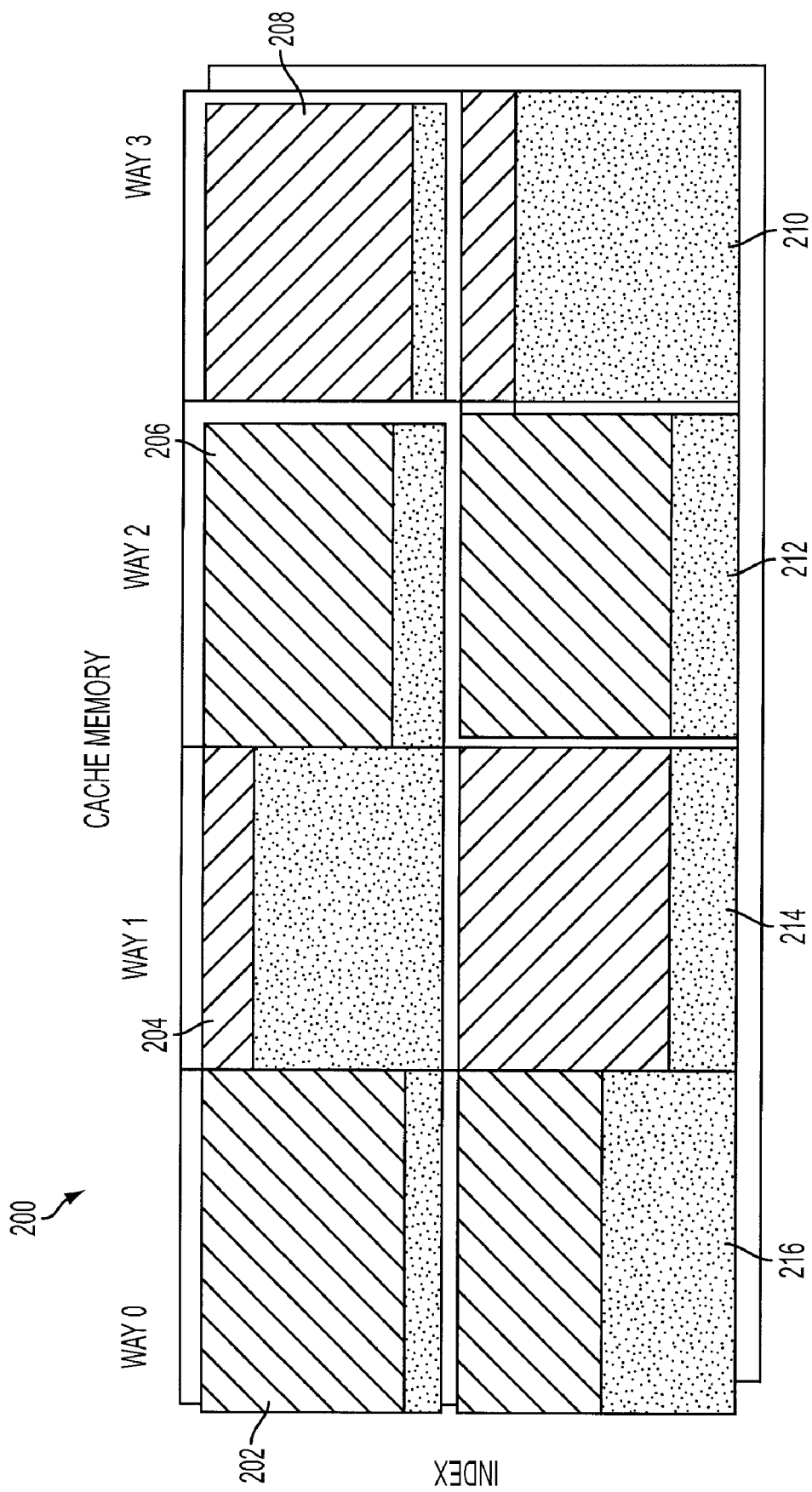
FIG. 2 is a block diagram of a cache memory illustrating a traditional method for storing a plurality of data packets.

FIG. 2 is a block diagram of a conventional cache memory 200 illustrating a traditional method for storing a plurality of data packets. Typically, cache memory associated with a processor may have a memory hierarchy that includes several levels of memory cache which are typically organized in a set-associative manner. The ability to hold the plurality of data packets in the cache memory 200 enables the processor to have fast access to the plurality of data packets. The plurality of memory buffers 202, 204, 206, 208, 210, 212, 214 and 216 depicted in FIG. 2 may be mapped into the cache, for example, mapped into locations that utilize the set-associative nature of the cache to allow co-residency of the data buffers. Note that in many cases both the size of the buffer and the organization of the cache (especially in lower cache levels) are linked to the size of the virtual page in the processor architecture (not shown).

The size of the cache memory and the level of associativity define the way the cache memory 200 will layout the plurality of data packets in the plurality of memory buffers. The plurality of data packets may be read from, or injected into the cache memory 200 using mechanisms such as DCA (and/or other mechanisms to place the data into cache memory). The cache memory 200 is traditionally organized using "Cache Line", "Way" and "Index." "Cache Line" is defined as a group of bytes allocated together, for example, 64 bytes. "Way" is a group of cache lines having non-overlapping least significant bits of addresses, and hence, the "Way" may be used as an index. As used herein, size_way=Cach_size/Number_of_Ways. The number of cache lines in the Way or the number of indexed cache lines is equal to the Index, the Index=size_way/cache_line. The number of ways or associatively level is a physical property that defines how many cache lines with the same number of low-address bits may be held simultaneously by the cache memory 200.

For example, if there is a cache memory having 256 KB of memory with 16-ways and a 64-byte cache line, the size of a way is 16 KB. All addresses which start with the same offset from a 16 KB aligned address will fall into the same index and are competing over the number of ways, i.e., at the best case 16 such addresses may be kept in the cache memory 200 at the same time. Because the data starts on a 2 KB or 4 KB block in a plurality of memory buffers of FIG. 2, there is a much higher usage of the addresses at the beginning of the memory buffer by 'real data' shown as shaded regions in each memory buffer of FIG. 2, while there are many other locations with low usage by real data (i.e., the unoccupied space in the memory buffer), shown as cross-hatched regions in each memory buffer of FIG. 2. Thus, the smaller the size of the data packet, the greater likelihood that the there is more reuse of portions of the cache memory 200, while other parts of the cache memory 200 are not utilized. This may cause cache evictions due to conflicts.

Figure 3:
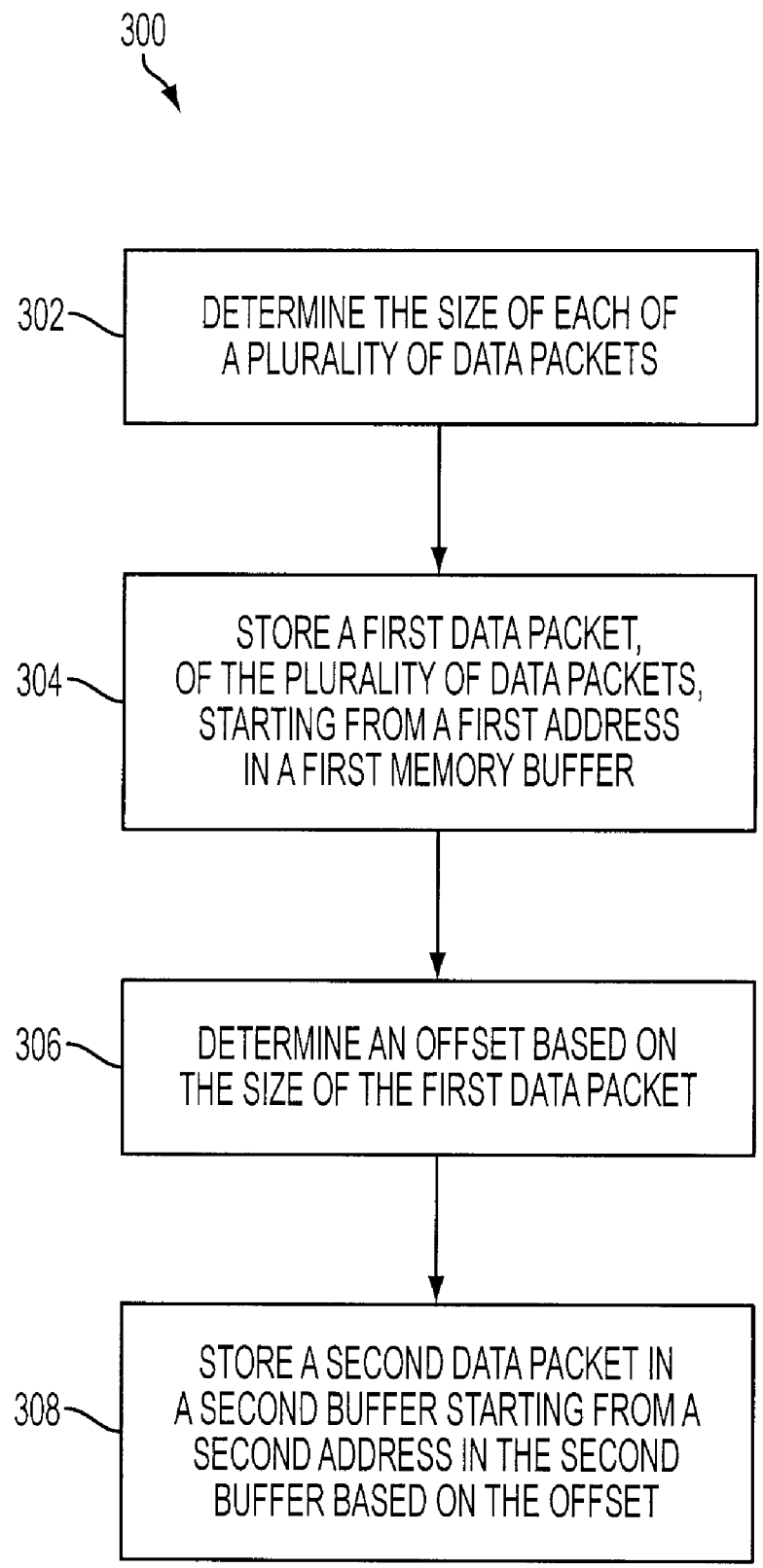
FIG. 3 illustrates a flowchart for storing a plurality of data packets in a plurality of memory buffers in a cache memory for reducing cache conflict problem, according to an exemplary embodiment of the present disclosure.

FIG. 3 illustrates a flowchart 300 for storing a plurality of data packets in a plurality of memory buffers in a cache memory for reducing cache conflicts. This flowchart assumes that a plurality of data packets are received in a data transmission medium, for example, a plurality of data packets is received by a LAN controller. The plurality of data packets are stored in the cache memory by spreading the plurality of data packets in the plurality of memory buffers and thereby reducing the stress on the number of ways as described in FIG. 2. The method of this embodiment includes determining the size of each of the plurality of data packets 302. This may be accomplished, for example, by a network interface card (NIC) and/or other LAN controller system. The method of this embodiment may also include storing a first data packet, of the plurality of data packets, starting from a first address in a first memory buffer of the plurality of memory buffers 304. The method of this embodiment may also include determining an offset based on the size of the first data packet 306. The method of this embodiment may also include storing a second data packet in a second buffer starting from a second address in the second buffer based on the offset 308. In alternative embodiments, the second data packet may be stored in the second buffer so that the end of the second data packet is stored at the end of the second buffer. For example, if the second data packet is too large to fit in the second buffer starting from the offset, and to prevent wraparounds, the second data packet may be stored in the second buffer starting at an address that ensures that the end of the second data packet coincides with the end of the second buffer.

Figure 4:
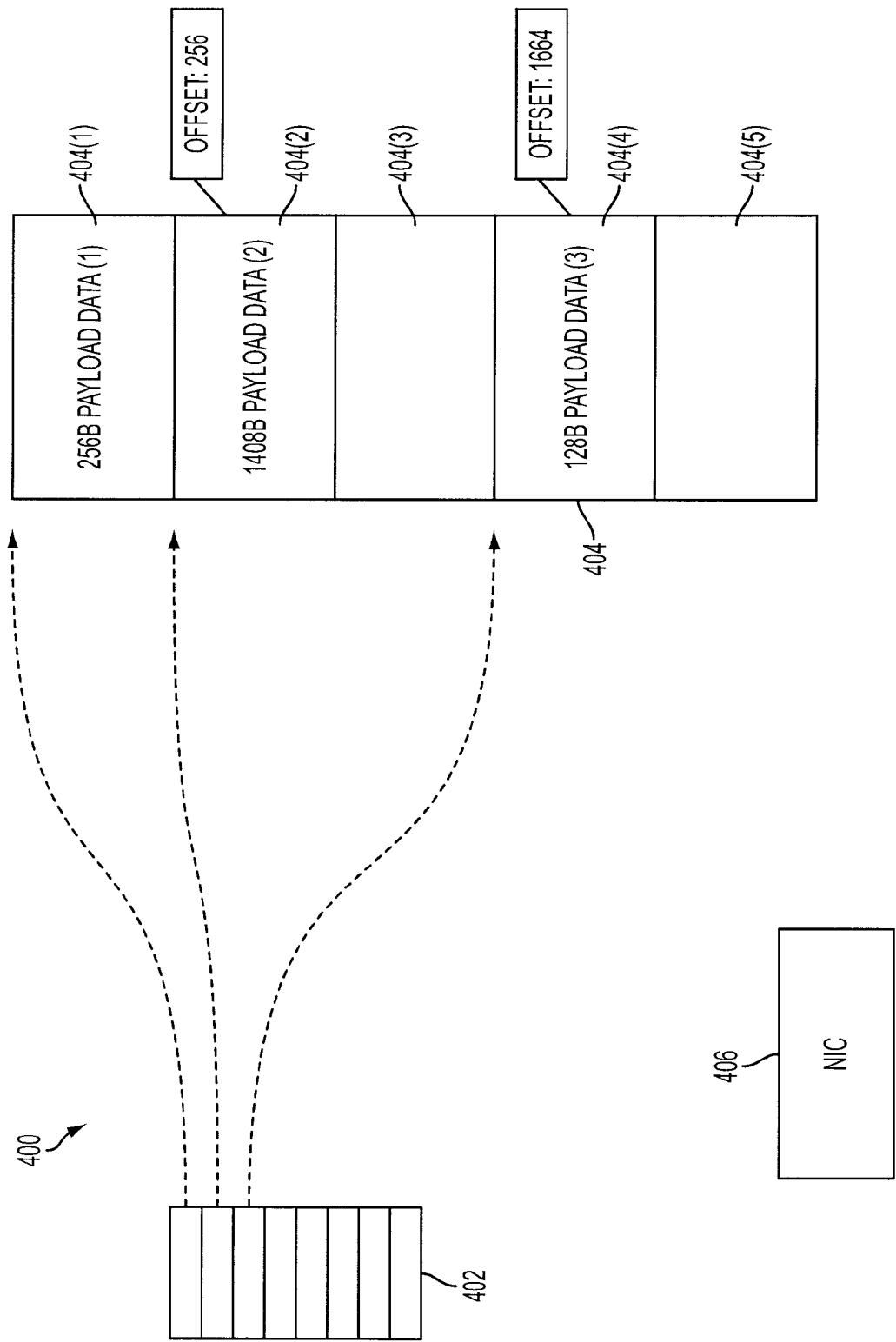
FIG. 4 is a block diagram illustrating a system for reducing cache conflicts, according to an exemplary embodiment of the present disclosure.

FIG. 4 depicts a system 400 for reducing cache conflicts according to one embodiment of the present disclosure. As shown in FIG. 4, the system includes a descriptor ring 402, a plurality of memory buffers 404 and a network interface card (NIC) 406. Each descriptor in the descriptor ring 402 includes a start address and control and status information of each of the respective buffers. In this example, the buffers 404 include memory buffer 404(1), memory buffer 404(2), 404(3), 404 (4), 404(5), etc. Each memory buffer may store a respective data packet.

For example, as shown in FIG. 4, the size the first data packet stored in the first buffer 404(1) is 256 B. Thus, the offset may be calculated as 256 B. If the size of the second buffer 404(2) is 2048 Bytes, then the second data packet of 1408 Bytes is stored in the second buffer 404(2) starting at the offset address of 256 B, since the offset plus the size of the second data packet is less than 2048 Bytes. The third data packet would then start at the offset of 1664 Bytes (256 B plus 1408 B). If, however, the second buffer is less than the offset of 256 B plus the size of the second data packet 1408 B, then the second data packet is stored in the second buffer starting at an address that ensures that the end of the second data packet coincides with the end of the second buffer. In this case the offset is the zeroed, and subsequent data packet is stored in its respective buffer with no offset.

Once the data is stored in a respective buffer, the status information in the descriptor information for that buffer may be updated, which may include, for example roll back information. The status information may be used by the driver to identify the location of the information in the buffer (which may include the size of the payload and roll back information). The driver may utilize the status information and an offset calculation used by the NIC to calculate the offset of the data within the buffer, as described below.

The computation of the size of a data packet of the plurality of data packets may be accomplished by the NIC 406. The first data packet is stored at a first address in a first memory buffer 404(1), the first memory buffer having a size of 2048 Bytes. The first address is stored in the descriptor ring 402. The size of the second data packet is determined by the NIC 406 and the second data packet is stored starting from a second address in the second memory buffer 404(2). The start of the second address is equal to the size of the first data packet and the second address is stored in the descriptor ring 402 for retrieving the second data packet. The size of the third data packet is determined by the NIC 406 and the third data packet is stored starting from a third address in the third memory buffer 404(3). The third address is equal to the size of the second data packet and the first data packet.

In order to store the plurality of data packets in the plurality of memory buffers in the cache memory an offset is maintained that points to an address in the first memory buffer 404(1). The offset also contains an offset of plurality of data packets, for example, the offset contains an offset of 256 Bytes after the first data packet is stored in the first memory buffer, thereafter the offset may be updated to contain an offset of 1664 Bytes after the second data packet is stored in the second memory buffer 404(2), the offset now being sum of the size of the first data packet and the second data packet. The size of the first data packet, the second data packet and the third data packet is determined by running a same algorithm by a software/LAN driver on the processor as the hardware. As a synchronous point, one bit in the descriptor ring 402 is set if the offset for a data packet of the plurality of data packets is equal to zero.

Further, the offset may be computed using Previous_offset, Previous_size, Current_size, Block_Size and Descriptor_Mark. The Previous_offset is an offset used for the write to the previous memory buffer (starting with a first address). Previous_size is a size of the previous payload put into the previous memory buffer. Current_size is a size of the present memory pay load. Block_Size_of_Memory_Buffer is a size of the memory buffer that is currently allocated, for example the first memory buffer 404 having a size of 2048 Bytes. Descriptor_Mark is a bit in the descriptor ring 402 that indicates when the offset is rolled back to zero for synchronization between LAN controller and the LAN driver software using the data stored in the buffers.

The following is exemplary psuedocode for computing the offset.

```
Tmp_Offset = Previous_offset + Previous_size
  If Tmp_Offset == BlockSize_of_Memory_Buffer
    Then {
    Offset = 0
        Descriptor_Mark = Roll_Back
        }
    Else {
        If Tmp_offset + Current_size < BlockSize_of_Memory_Buffer
            Then Offset = Tmp_Offset
            Else Offset = BlockSize – Current_size
        Descriptor_Mark = No_Roll_Back
        }
    Previous_offset = Offset // for next data packet
```

Alternate embodiments may roll back the offset parameter if the new packet extends beyond the end of the buffer (e.g., Tmp_offset+
Current_size>=BlockSize_of_Memory_Buffer). In this case, an Offset=0 may be used.

As described above, the embodiments of the disclosure may be in the form of computer-implemented processes and apparatuses for practicing those processes. Embodiments of the disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The forgoing description may provide for enhanced cache memory operations. When the data resides in memory elements such as DRAM that are organized in channels of memory, it may be desirable to spread the work load among the different channels. For this purpose, in many cases, the memory devices may be organized as 'interleaved' memories such that every group of addresses (e.g., 64-byte cache line) is located in a different device. Thus, when accessing a block of memory the effective bandwidth achieved is greater than that of a single channel (up to the sum of the channels in the optimal case). For example, using conventional data storage methodology, when data packets start at the beginning of a block, and small packets are in use (such as 64-byte packets), in many cases these end up hitting on the same channel and preventing the bandwidth gain achieved by spreading the access across multiple channels. By putting the data into memory locations that have different offsets from one another, the effect of all packets accessing the same channel is overcome and both channels may be used in a more homogenous pattern, which may increase the effective bandwidth of the system.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for storing a plurality of data packets in a plurality of memory buffers for reducing cache conflicts, the method comprising:
   determining size of each of the plurality of data packets;
   storing a first data packet of the plurality of data packets starting from a first address in a first memory buffer of the plurality of memory buffers;
   determining an offset based on the size of the first data packet; and
   storing a second data packet in a second buffer starting from a second address based on the offset; wherein if the second buffer has a size greater than the offset plus the size of the second data packet, then the second data packet is stored in the second buffer starting at an address equal to the offset, and wherein if the second buffer has a size less than the offset plus the size of the second data packet but greater than the size of the second data packet, then the second data packet is stored in the second buffer so that the end of the second data packet coincides with the end of the second buffer.

2. The method of claim 1, wherein size of each of the plurality of memory buffers is a fixed value.

3. The method of claim 1, wherein the plurality of data packets is stored in a cache memory in a set-associative manner.

4. A system for reducing cache conflict, comprising:
   a Local Area Network (LAN) controller for receiving a plurality of data packets; and
   a plurality of memory buffers capable of storing the plurality of data packets; and
   said LAN controller is configured to store the plurality of data packets in the cache memory by:
   determining size of each of the plurality of data packets;
   storing a first data packet of the plurality of data packets starting from a first address in a first memory buffer of the plurality of memory buffers;
   determining an offset based on the size of the first data packet; and
   storing a second data packet in a second buffer starting from a second address based on the offset; wherein if the second buffer has a size greater than the offset plus the size of the second data packet, then the second data packet is stored in the second buffer starting at an address equal to the offset, and wherein if the second buffer has a size less than the offset plus the size of the second data packet but greater than the size of the second data packet, then the second data packet is stored in the second buffer so that the end of the second data packet coincides with the end of the second buffer.

5. The system of claim 4, wherein size of each of the plurality of memory buffers is a fixed value.

6. The system of claim 4, wherein the plurality of data packets is stored in the plurality of memory buffers in a set-associative manner.

7. A computer program product embodied on a tangible computer readable storage medium for storing a plurality of data packets in a plurality of memory buffers in a cache memory for reducing cache conflict problem, the computer program product comprising a program module having instructions for:
   determining size of each of the plurality of data packets;
   storing a first data packet of the plurality of data packets starting from a first address in a first memory buffer of the plurality of memory buffers;
   determining an offset based on the size of the first data packet; and
   storing a second data packet in a second buffer starting from a second address based on the offset; wherein if the second buffer has a size greater than the offset plus the size of the second data packet, then the second data packet is stored in the second buffer starting at an address equal to the offset, and wherein if the second buffer has a size less than the offset plus the size of the second data packet but greater than the size of the second data packet, then the second data packet is stored in the second buffer so that the end of the second data packet coincides with the end of the second buffer.

8. The computer program product of claim 7, wherein size of each of the plurality of memory buffers is a fixed value.

9. The computer program product of claim 7, wherein the plurality of data packets is stored in the plurality of memory buffers in a set-associative manner.

* * * * *